United States Patent [19]
Ivey et al.

[11] 3,819,962
[45] June 25, 1974

[54] BALLISTIC IMPACT DETECTOR

[75] Inventors: Larry E. Ivey; Theodore A. Henriquez, both of Orlando, Fla.

[73] Assignee: The United States of America as represented by the Secretary of the Navy, Washington, D.C.

[22] Filed: May 4, 1973

[21] Appl. No.: 357,147

[52] U.S. Cl. .......... 310/8.3, 73/133 D, 273/102.2 R, 273/102.2 S, 310/9.1
[51] Int. Cl. ............................................. H04r 17/00
[58] Field of Search ............... 310/8.1, 8.2, 8.3, 8.7, 310/9.1, 9.4; 273/102.2 R, 102.2 S; 73/133 D

[56] References Cited
UNITED STATES PATENTS

| | | | |
|---|---|---|---|
| 3,392,979 | 7/1968 | Wilska | 310/8.1 X |
| 3,479,032 | 11/1969 | Ohlund et al. | 273/102.2 R |
| 3,682,478 | 8/1972 | Knight | 273/102.2 S |
| 3,690,661 | 9/1972 | Scharz et al. | 310/8.6 X |

*Primary Examiner*—J. D. Miller
*Assistant Examiner*—Mark O. Budd
*Attorney, Agent, or Firm*—R. S. Sciascia; Arthur L. Branning

[57] ABSTRACT

A ferroelectric ceramic ring transducer assembly for reliably sensing projectile impacts upon a target surface. The transducer is mounted by a single hole in the target to allow unimpeded vibration at the resonance frequency. In addition, the ring is designed to have a resonance frequency which matches the compressional impact shockwave to guard against false readings.

3 Claims, 3 Drawing Figures

PATENTED JUN 25 1974 3,819,962

BALLISTIC IMPACT DETECTOR

BACKGROUND OF THE INVENTION

This invention relates generally to impact detectors and more specifically to piezoelectric disc transducers for sensing projectile hits upon a target surface. Piezoelectric transducers known to the prior art have been found to be sensitive to false responses such as movements in the target caused by wind, vibration, shockwave from a projectile missing a target, or stray objects hitting the target. These prior devices also require the drilling of a number of accurately placed holes for the stud mounting of the transducer so that when impact is made with the target the piezoelectric transducer is stretched to cause an electrical impulse. If the holes for the studs are not accurately located, the transducers may be broken in installation, due to their delicate construction, or fail to perform because of a lack of displacement upon impact. Since the prior devices are relatively expensive and are expended by a direct hit, a need arose for a new hit detector.

SUMMARY OF THE INVENTION

It is therefore an object of the present invention to provide an inexpensive hit detector.

It is another object of the present invention to provide a hit detector that is reliable and easy to install on the target.

Another object of the invention is to provide a hit detector which is not sensitive to false detection.

Other objects, advantages and novel features of the invention will become apparent from the following detailed description of the invention when considered in conjunction with the accompanying drawings.

The above objects are attained according to the invention by providing a transducer constructed so as to be sensitive to compressional waves which are produced in the target upon a direct hit rather than to flexure waves as sensed in prior devices. By sensing compressional waves, the transducer becomes sensitive to pulses produced in the plane of the target which occur when a projectile hits or penetrates the target. As a result, movements in the target due to wind, vibration, shockwave, or stray objects hitting the target, etc., which do not produce these compressional waves, do not normally give false indications of a hit.

The sensitivity of the device to compressional waves is achieved by mounting the transducer in a free condition which permits a higher Q at resonance. The transducer consists of a ferroelectric ceramic ring having a resonance frequency which matches the compressional wave frequencies of the target, thereby further facilitating the sensing of compressional waves. The transducer is preferably mounted by a single hole so that it can be easily mounted on the target and removed after use.

DETAILED DESCRIPTION OF THE PREFERRED EMBODIMENT

Figure 3:
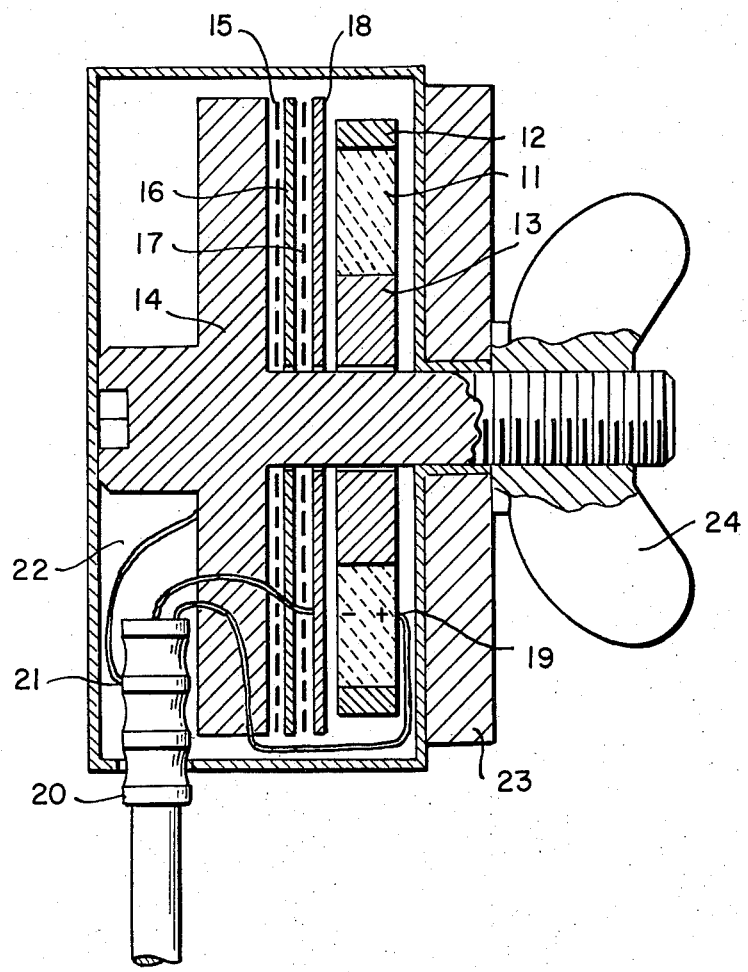
FIG. 3 is a cross-sectional elevation view of a preferred embodiment of the invention.

Referring now to FIG. 3 there is shown a cutaway view of the transducer of the present invention. It consists of a ferroelectric ceramic element 11, which is 5.72 cm OD × 3.175 cm ID × 0.365 cm thick. To the outside and inside of the ceramic element are cemented fitted rings of corprene as shown as 12 and 13 respectively. The ferroelectric ceramic element assembly 11, 12 and 13 is then attached to the mount assembly 14, which comprises a stainless-steel washer silver soldered to a ⅜-24 × 1½-in Allen head machine bolt. Other elements shown in the assembly of FIG. 3 are an epoxy resin 15 which coats the inside surface of mount assembly 14, a fiberglass cloth insulator 16, another layer of epoxy 17, and an electrode foil 18 comprising the negative polarity connection of the ceramic element 11. A tinned copper wire is soldered in six places 19 to the positive polarity electrode of the ceramic element. This lead passes around the element and is attached to a cable assembly 20. The negative lead from the electrode foil is also attached to the cable assembly.

The cable assembly 20 consists of a 3.0-meter, 2-conductor, shielded cable which is connected to a hit box receiver. At the transducer end, a copper ferrule 21 is swaged to the cable. The ferrule helps to seal the transducer against moisture penetration and acts as a mechanical clamp for the cable. The outer shield for the cable is connected to the ferrule under the swage grooves. A lead is connected from the ferrule 21 to the mount assembly.

The entire ceramic element and mount assembly is potted with a very hard epoxy resin 22. This epoxy has mechanical parameters closely approximating those of new plastic targets (25 in FIGS. 1 and 2) presently being used by the U.S. Army.

Figures 1, 2:
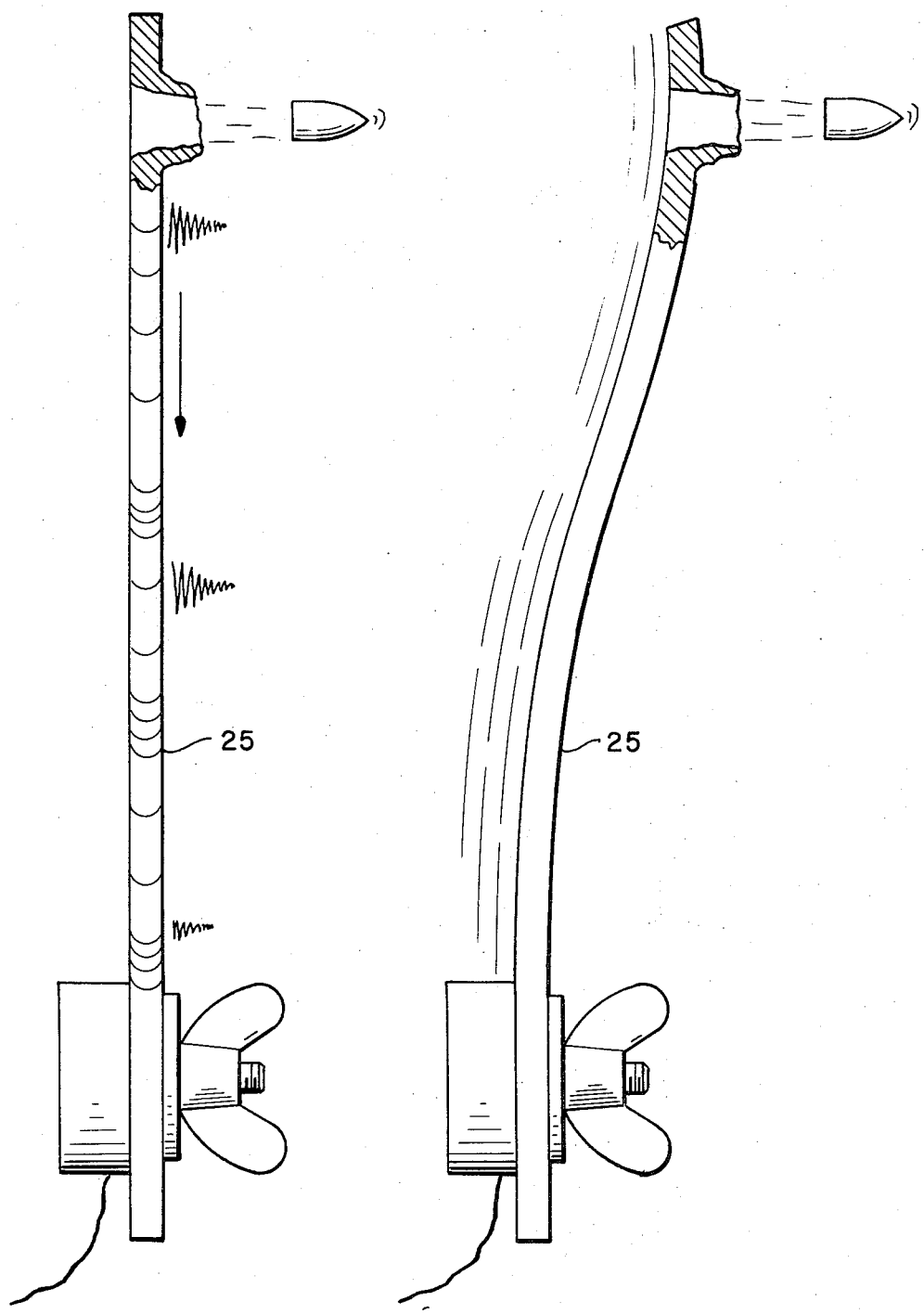
FIG. 1 illustrates compressional waves as they are produced in the target.
FIG. 2 illustrates flexure waves as they are produced in the target.

A stainless steel washer 23 and the wingnut 24 clamp the transducer to the lower edge of the target from the reverse side thereof, as shown in FIGS. 1 and 2. The potting compound 22 permits maximum coupling of the pulse from the target to the ferroelectric ceramic element so that the ceramic element 11 is deformed by the pulse wave, thus producing an electrical charge. The corprene material 12, 13, around the outside and inside of the ceramic element 11 allows the ceramic element to vibrate or deform freely with minimum damping. The corprene also shields the edges acoustically thus allowing a higher charge coefficient.

The electrical signal produced is detected by a hit box receiver to which the transducer is connected or any type of signaling device. The hit box package scores a hit by lighting a light or throwing up a flare.

A clear advantage of the transducer of the present invention over the prior devices is that it is easy to install into the target; i.e., only one drilled hole in the target is required. Also the wingnut holding the assembly to the target is quickly fastened by hand without need for other tools. In addition, the ferroelectric ceramic element is mounted in a free condition, which permits a higher Q at resonance as compared with that obtained by the existing transducer used in a clamped condition.

The transducer is sensitive to pulses in the target rather than movement of the target itself. The projectile sets up a compressional wave pulse as shown in FIG. 1 and a flexural wave as shown in FIG. 2.

By turning the transducer to a compressional wave frequency, it is not subject to any of the interferences inherent in flexural wave detection. The resonance frequency of the ceramic element matches one of the compressional wave frequencies in the target, which increases the detection probability and discriminates against false hit indications caused by wind, acoustic shockwave from muzzle blast, and debris from short rounds. In addition, the transducer can withstand more physical abuse than transducers now being used, while its manufacturing cost is much less. The transducer can also be easily shielded (if necessary to shield against electrostatic and RF interference) by coating it with a liquid shielding product. This shielding makes contact with the copper swaged ferrule 2, which can be grounded at the hit box receiver end of the cable.

Obviously many modifications and variations of the present invention are possible. For example, the type of sensor material can be changed provided that its required resonance frequency and high capacitance be maintained. The encapsulating material can also be changed if the target material is changed. The pressure release material shielding the edges of the crystal can be any closed cell elastomer. The cable can be any 2-conductor shielded type. The center bolt can be many sizes and thread types. It is therefore to be understood that within the scope of the appended claims the invention may be practiced otherwise than as specifically described.

What is claimed and desired to be secured by Letters Patent of the United States is:

1. A ballistic impact detector for sensing compressional waves produced in a target comprising:
   a ferroelectric ceramic ring having inside and outside faces and a resonant frequency substantially equal to said compressional waves;
   corprene rings attached to said inside and outside faces to facilitate vibration of said ferroelectric ceramic ring along its radius;
   means for directly attaching said ferroelectric ceramic ring and said corprene rings to said target surface so that said ferroelectric ceramic ring is caused to vibrate only when a compressional wave is produced in said target;
   means for bonding said ferroelectric ceramic ring and said corprene rings to said attaching means; and,
   output means attached to said ferroelectric ring for sensing electrical signals produced by said ferroelectric ring upon vibration.

2. The detector of claim 1 wherein said attaching means comprises a single bolt adapted to fit through a single hole in said target for attachment with a wingnut.

3. The device of claim 2 wherein said means for bonding comprises a material of a similar nature to the material of said target.

* * * * *